US007131470B1

(12) United States Patent
Sommers

(10) Patent No.: US 7,131,470 B1
(45) Date of Patent: Nov. 7, 2006

(54) FENCE ROUTER TABLE SYSTEM

(76) Inventor: James Sommers, 1841 12th St. SE., Largo, FL (US) 33771

( * ) Notice: Subject to any disclaimer, the term of this patent is extended or adjusted under 35 U.S.C. 154(b) by 0 days.

(21) Appl. No.: 11/243,368

(22) Filed: Oct. 4, 2005

Related U.S. Application Data

(63) Continuation-in-part of application No. 10/769,335, filed on Jan. 30, 2004, now abandoned.

(51) Int. Cl.
*B25H 1/02* (2006.01)
*B23C 1/16* (2006.01)

(52) U.S. Cl. .............................. 144/286.5; 144/135.2; 144/136.1; 144/137; 144/144.1; 144/145.1; 144/3.1; 409/86; 409/92; 409/125; 33/25.1

(58) Field of Classification Search ................. 144/2.1, 144/3.1, 134.1, 135.2, 135.3, 135.4, 137, 144/144.1, 144.41, 144.51, 145.1, 144.2, 144/286.1, 287, 286.5; 33/23.01, 23.11, 33/25.1, 25.5; 409/86, 87, 92, 109, 121, 409/124, 125, 130
See application file for complete search history.

(56) References Cited

U.S. PATENT DOCUMENTS 1,696,032 A * 12/1928 Glover ....................... 409/186
3,222,984 A * 12/1965 Loshin .......................... 355/2
3,739,824 A * 6/1973 Hoenig .................... 144/144.1
3,858,630 A * 1/1975 Cherry et al. ............ 144/144.1
4,221,052 A * 9/1980 Wagoner .................... 33/25.2
4,554,740 A * 11/1985 Gill ............................ 33/25.1
5,203,088 A * 4/1993 Morgan ...................... 33/21.1

* cited by examiner

*Primary Examiner*—Derris H. Banks
*Assistant Examiner*—Shelley Self
(74) *Attorney, Agent, or Firm*—Edward P. Dutkiewicz

(57) ABSTRACT

A table with a working surface has a parallel rail on each side of the working surface. A slide assembly includes a shaft with ends and a pair of brackets. Each bracket has a hole. The holes receive the ends of the shaft. The slide assembly includes cylindrical tunnels. The tunnels slidably receive the rails. An operating assembly has primary and secondary arms. Each arm has a free exterior end and an interior portion. The interior portion is coupled to the shaft. A router is secured to, and depends from, the free end of the secondary arm. Control mechanisms include a scribe. The scribe is secured to, and depends from, the free end of the primary arm. Movement of the primary arm and scribe with respect to a template will cause corresponding movement of the secondary arm and router with respect to work pieces to be routed.

6 Claims, 7 Drawing Sheets

FIG 1
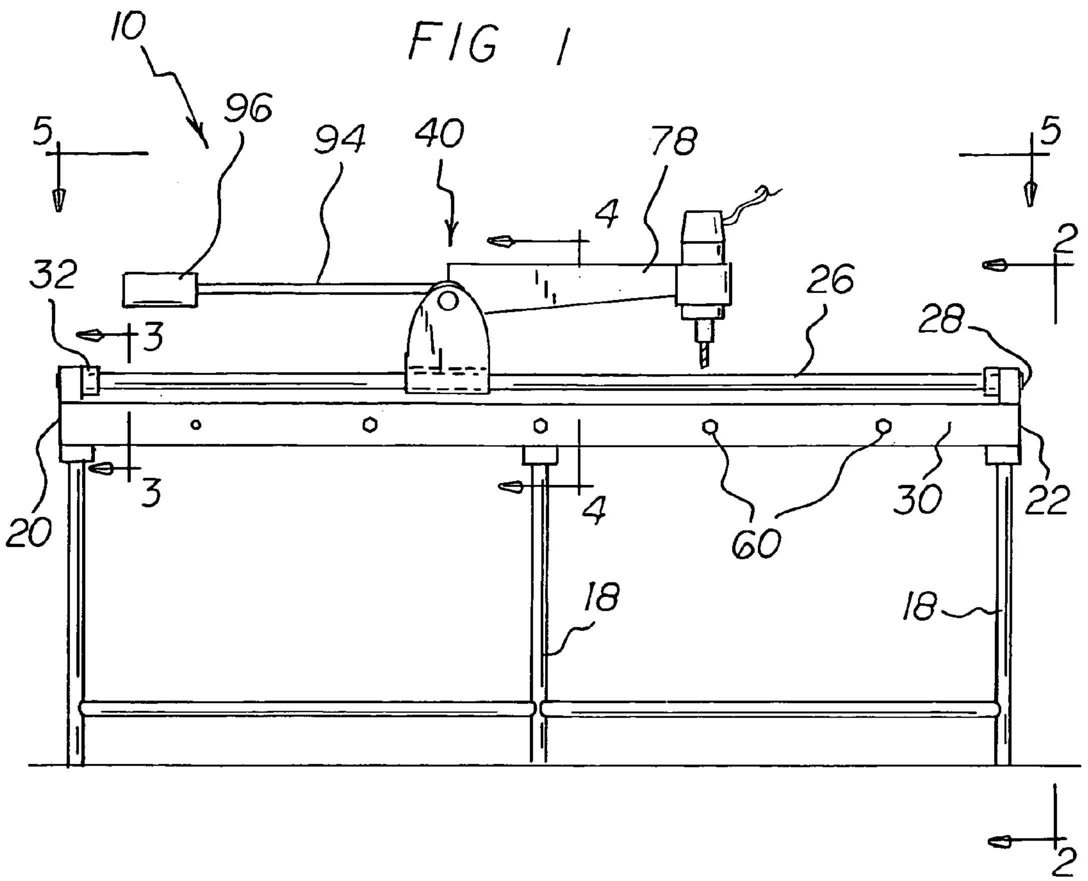
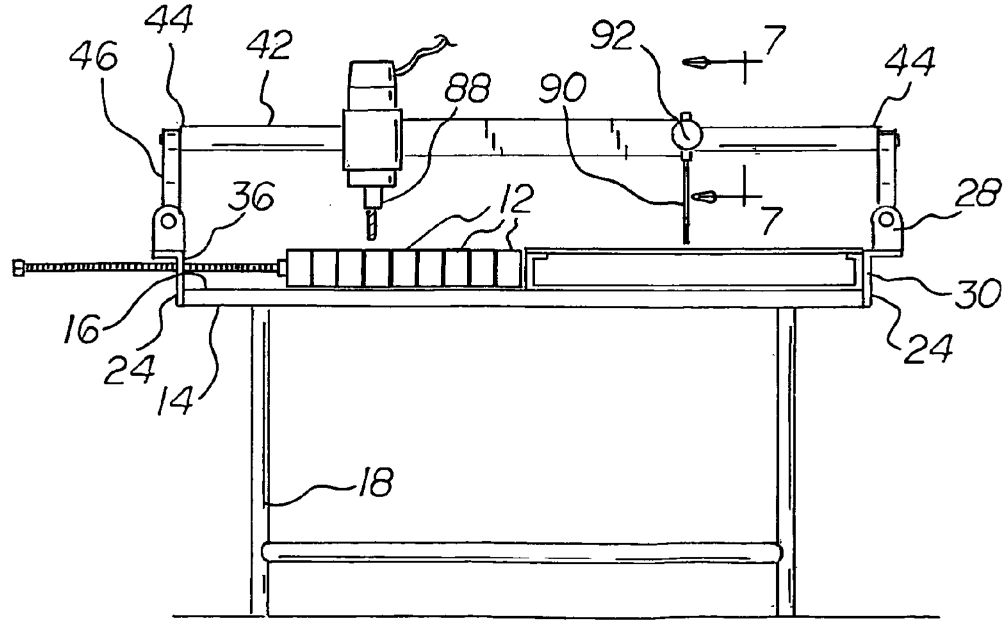
FIG 2

FIG 7
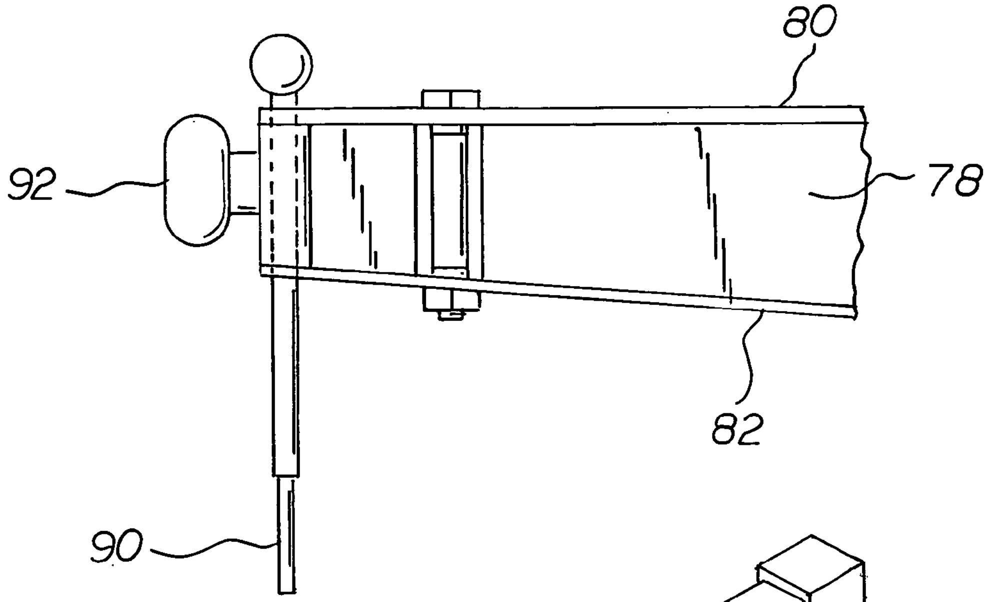
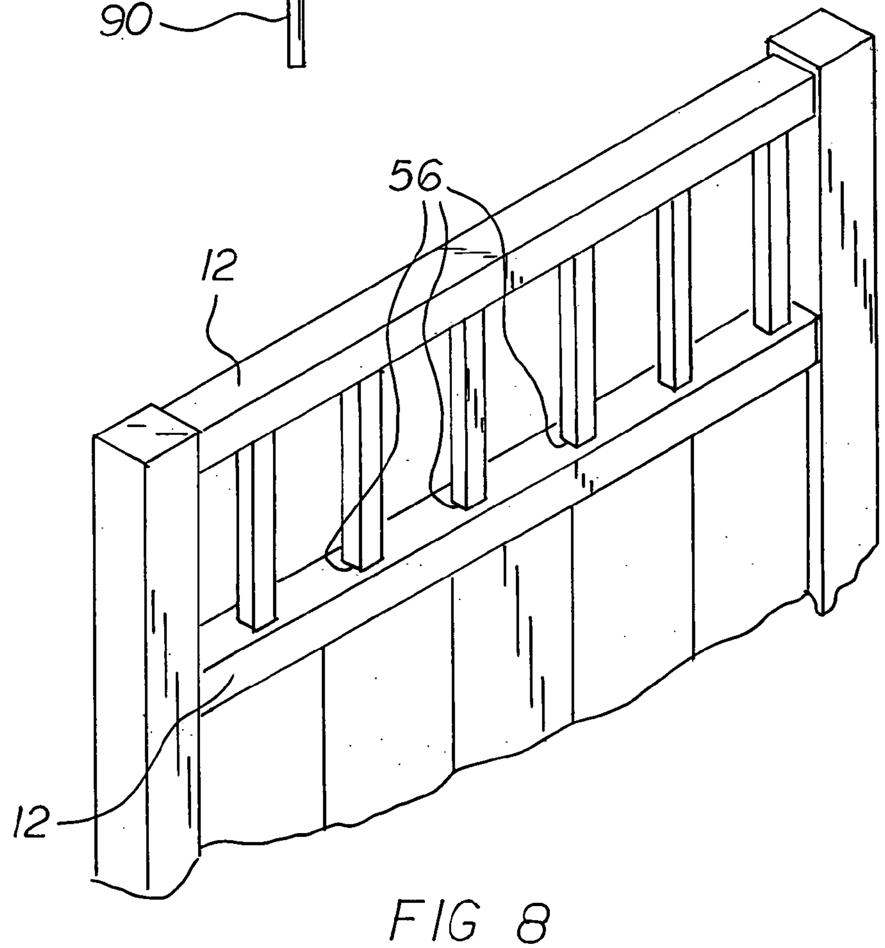
FIG 8

FIG 9
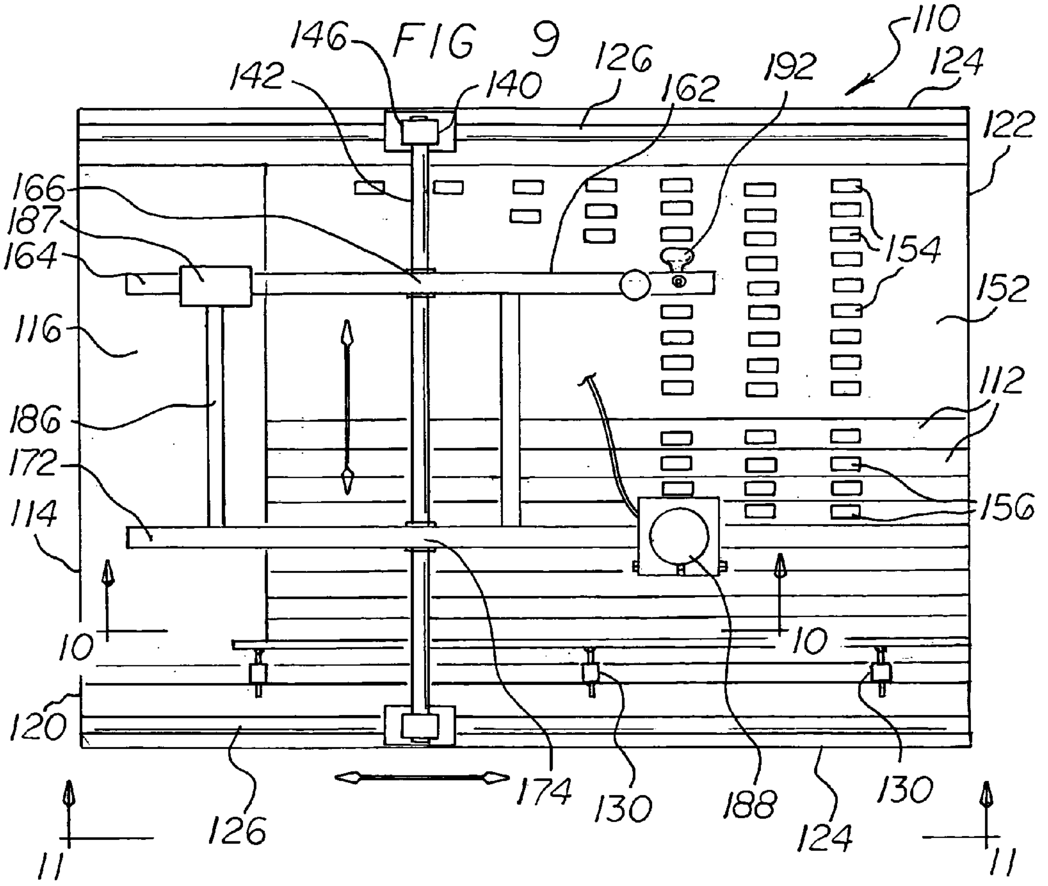
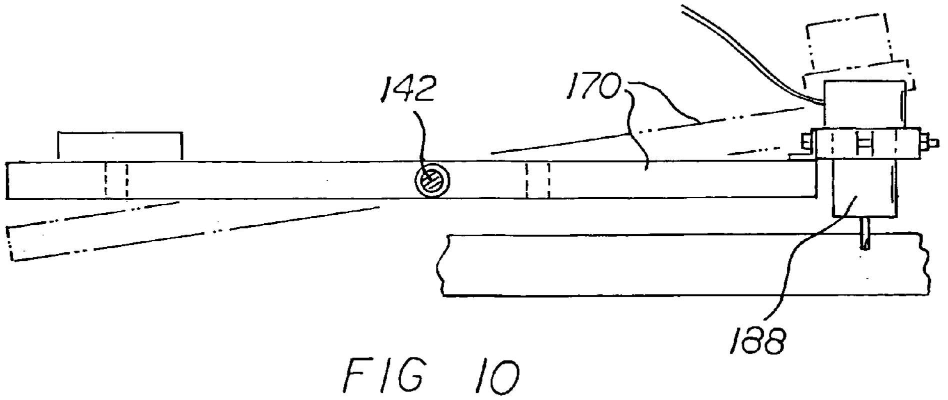
FIG 10

FIG 13
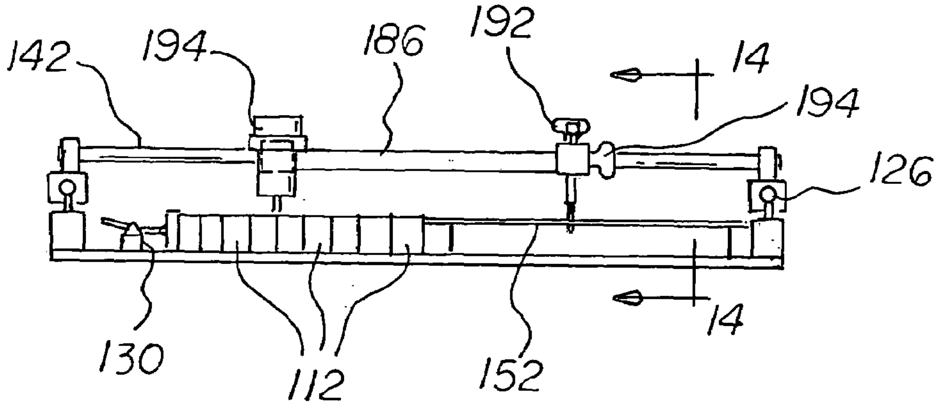
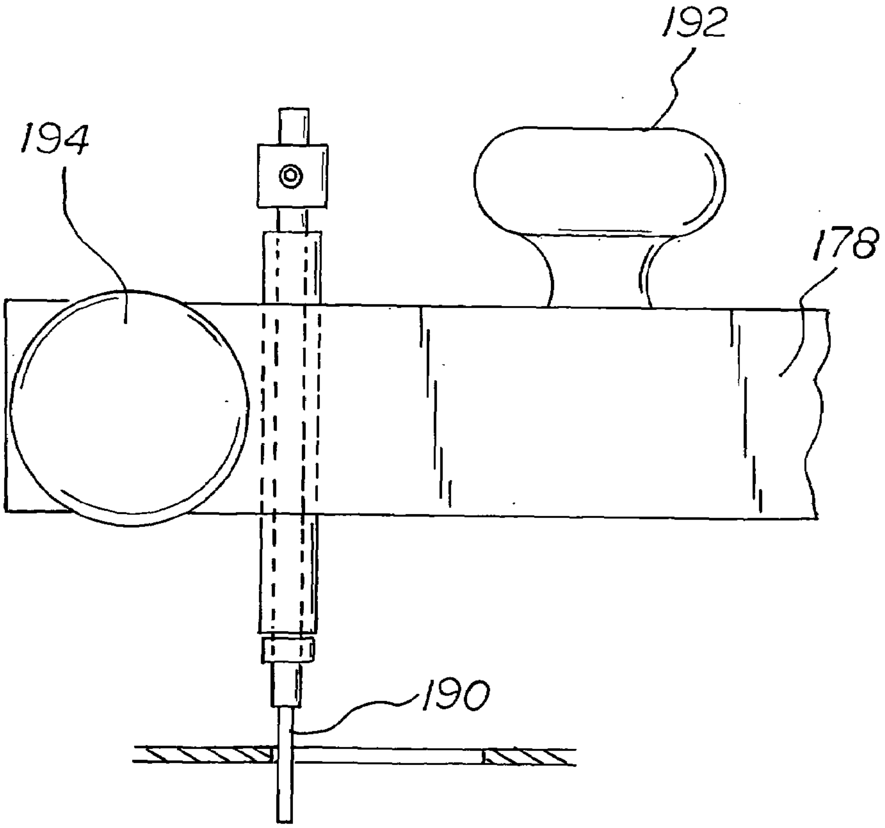
FIG 14

FENCE ROUTER TABLE SYSTEM

RELATED APPLICATION

The present application is a continuation-in-part of U.S. patent application Ser. No. 10/769,335 filed Jan. 30, 2004 now abandoned.

BACKGROUND OF THE INVENTION

1. Field of the Invention

The present invention relates to a fence router table system and more particularly pertains to supporting and routing linear fence components in a safe, accurate, and efficient manner.

2. Description of the Prior Art

The use of pantographs and routers of known designs and configurations is known in the prior art. More specifically, pantographs and routers of known designs and configurations previously devised and utilized for the purpose of fabricating fences through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,696,032 issued Dec. 18, 1928 to Glover relates to an engraving cutter head and depth gauge. U.S. Pat. No. 3,222,984 issued Dec. 14, 1965 to Loshin relates to a coordinate transformation. U.S. Pat. No. 3,739,824 issued Jun. 19, 1973 to Hoenig relates to a pantograph apparatus. U.S. Pat. No. 4,554,740 issued Nov. 26, 1985 to Gill relates to pantographs. Lastly, U.S. Pat. No. 5,203,088 issued Apr. 20, 1993 to Morgan relates to a method and machine for the engraving of articles.

While these devices fulfill their respective, particular objectives and requirements, the aforementioned patents do not describe fence router table system that allows supporting and routing linear fence components in a safe, accurate, and efficient manner.

In this respect, the fence router table system according to the present invention substantially departs from the conventional concepts and designs of the prior art, and in doing so provides an apparatus primarily developed for the purpose of supporting and routing linear fence components in a safe, accurate, and efficient manner.

Therefore, it can be appreciated that there exists a continuing need for a new and improved fence router table system which can be used for supporting and routing linear fence components in a safe, accurate, and efficient manner. In this regard, the present invention substantially fulfills this need.

SUMMARY OF THE INVENTION

In view of the foregoing disadvantages inherent in the known types of pantographs and routers of known designs and configurations now present in the prior art, the present invention provides an improved fence router table system. As such, the general purpose of the present invention, which will be described subsequently in greater detail, is to provide a new and improved fence router table system and method which has all the advantages of the prior art and none of the disadvantages.

To attain this, the present invention essentially comprises a table. The table has a planar working surface. Such surface is in a horizontal plane. The table has depending legs to maintain the table and working surface at a desired height. The working surface has a near side and a parallel far side and parallel lateral sides there between. The sides are thus in a rectangular configuration. A parallel rail is located above each lateral side with fixed blocks spaced along each lateral side supporting the rails.

Provided next is a support subassembly for each rail. Each support subassembly has an aluminum extruded base with arcuate recesses for weight reduction and with a bottom and a top. Each support subassembly also has a plurality of laterally spaced fixed tubular blocks fabricated of nylon and formed as precision shaft supports. Each fixed tubular block is located between the top of a base and a rail. The bases have vertical bores there through with bolts extending upwardly through the bores and the blocks and threadedly received in the rails along their lengths.

The working surface has a center line parallel with, and midway between, the lateral sides. The center line divides the working surface into a first half and a second half. There are also spaced spacers adjacent to the second half having threaded holes there through.

Next provided is a slide assembly. The slide assembly includes a tubular member with ends positioned above the rails. Also included is pair of brackets coupling the ends of the shaft with the rails. Each bracket has a circular upper hole receiving the ends of the shaft and a cylindrical lower tunnel slidably receiving the rails. The brackets thus function for supporting and moving the tube in a path of movement always parallel with the near and far sides.

A template is next provided. The template is removably positioned on the first half of the working surface. The template has primary recesses. The recesses are formed with profiles.

Next provided are a plurality of linear fence components. Such fence components are removably positioned in parallel relationship on the second half of the working surface. The fence components include a first edge, one of which is in contact with the template. The fence components also have a second edge. In association therewith, there is also provided toggle clamps FIG. 13 #130 connected to close simultaneously. Such arrangement is to securely retain the fence components in parallel relationship with each other and in contact with the template. The fence components are adapted to receive secondary recesses with profiles which correspond to the profiles of primary recesses in the template.

Next provided is an operating assembly. Their operating assembly includes a primary arm. The primary arm has a free exterior end extending toward the far side. The primary arm also has an interior portion slidably coupled to the shaft. The operating assembly also has a secondary arm and a free exterior end. The exterior end extends toward the far side and has an interior portion slidably coupled to the shaft. Each arm includes a pair of vertical plates and adjacent upper and lower plates. The operating assembly also has cross arms with ends coupled to the primary and secondary arms on opposite sides of the shaft. Such arrangement is for allowing the raising and lowering of the exterior ends of the arms. In this manner, movement of the primary arm will cause corresponding movement of the secondary arm with the primary and secondary arms always parallel to each other.

Provided next is power driven router which is secured to, and depends from, the free end of the secondary arm. The router is located over the linear fence components for forming recesses in the linear fence components.

Lastly provided are control mechanisms. The control mechanisms include a scribe secured to, and depending from, the free end of the primary arm. The scribe is located over the template with a knob adapted to be held by a user in moving the scribe to outline the profiles of the primary recesses. The control mechanisms also includes a handle with an exterior end constituting a grip and an interior portion threadedly coupled to the shaft. These components are for guiding the router in forming the profiles of the primary and secondary recesses. The grip is also adapted to function as a variable counter weight by being rotated to increase and decrease the moment of inertia of the operating assembly around the shaft.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fence router table system which has all of the advantages of the prior art pantographs and routers of known designs and configurations and none of the disadvantages.

It is another object of the present invention to provide a new and improved fence router table system which may be easily and efficiently manufactured and marketed.

It is further object of the present invention to provide a new and improved fence router table system which is of durable and reliable constructions.

An even further object of the present invention is to provide a new and improved fence router table system which is susceptible of a low cost of manufacture with regard to both materials and labor, and which accordingly is then susceptible of low prices of sale to the consuming public, thereby making such fence router table system economically available to the buying public.

Even still another object of the present invention is to provide a fence router table system for supporting and routing linear fence components in a safe, accurate, and efficient manner.

Lastly, it is an object of the present invention to provide a new and improved fence router table system. A table with a working surface has a parallel rail on each side of the working surface. A slide assembly includes a shaft and a pair of brackets. Each bracket has a hole. The holes receive the ends of the shaft. The slide assembly includes cylindrical tunnels. The tunnels slidably receive the rails. An operating assembly has primary and secondary arms. Each arm has a free exterior end and an interior portion. The interior portion is coupled to the shaft. A router is secured to, and depends from, the free end of the secondary arm. Control mechanisms include a scribe. The scribe is secured to, and depends from, the free end of the primary arm. Movement of the primary arm and scribe with respect to a template will cause corresponding movement of the secondary arm and router with respect to work pieces to be routed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred and alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a fence router table system constructed in accordance with the principles of the present invention.

FIG. 2 is a far side elevational view of the system taken along line 2—2 of FIG. 1.

FIG. 7 is a cross sectional view of the system taken along line 7—7 of FIG. 2.

FIG. 8 is a perspective illustration of a section of a fence fabricated by the system of the present invention.

FIG. 9 is a plan view similar to FIG. 5 bur illustrating an alternate embodiment of the invention.

FIG. 10 is a side elevational view of the operating assembly taken along line 10—10 of FIG. 9 showing the arms in a first or operative orientation and, in a broken line showing, in a second or inoperative orientation.

FIG. 13 is a cross sectional view of the system taken along line 13—13 of FIG. 11.

FIG. 14 is a cross sectional view of the system taken along line 14—14 of FIG. 13.

The same reference numerals refer to the same parts throughout the various Figures.

DESCRIPTION OF THE PREFERRED EMBODIMENT

Figure 3:
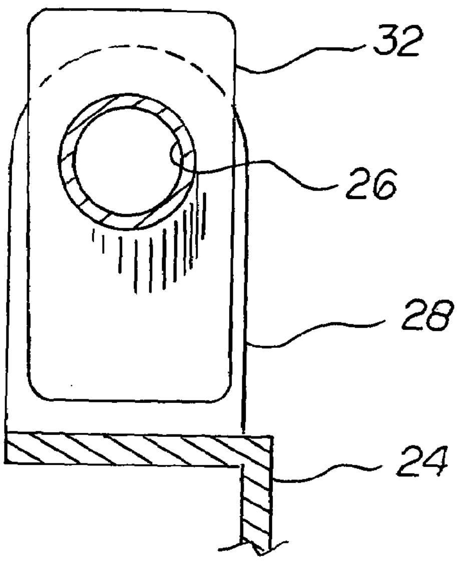
FIG. 3 is a cross sectional view of the system taken along line 3—3 of FIG. 1.
Figure 4:
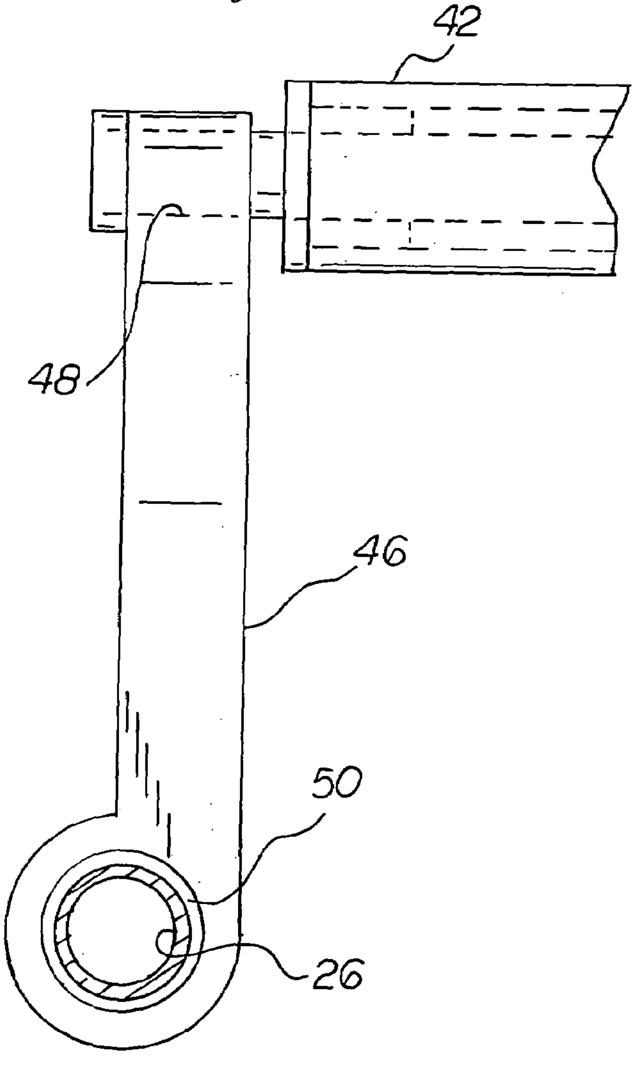
FIG. 4 is a cross sectional view of the system taken along line 4—4 of FIG. 1.
Figure 5:
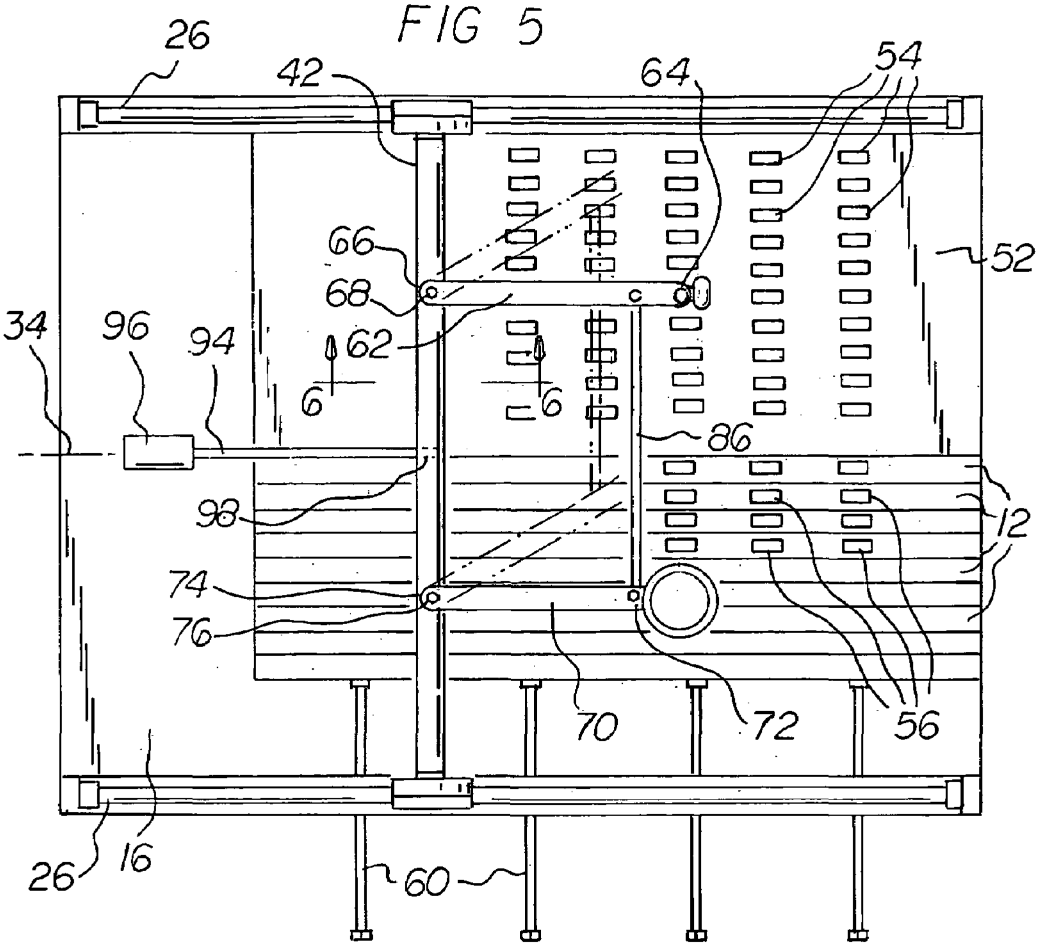
FIG. 5 is a plan view of the system taken along line 5—5 of FIG. 1.
Figure 6:
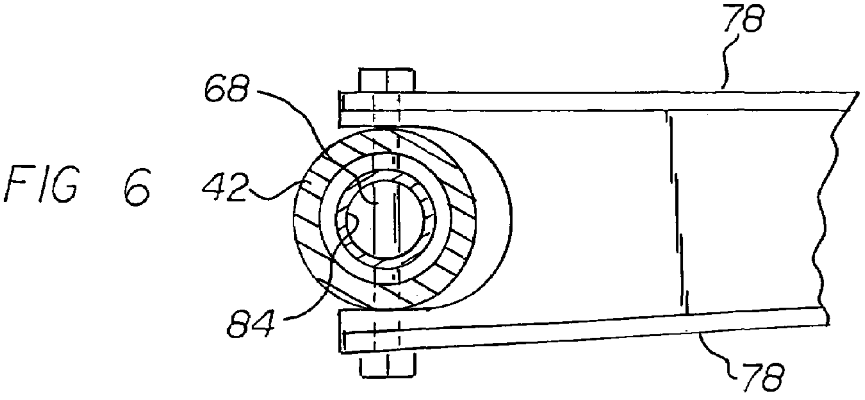
FIG. 6 is a cross sectional view of the system taken along line 6—6 of FIG. 5.

With reference now to the drawings, and in particular to FIG. 1 thereof, the preferred embodiment of the new and improved fence router table system embodying the principles and concepts of the present invention and generally designated by the reference numeral 10 will be described.

The present invention, the fence router table system 10 is comprised of a plurality of components. Such components in their broadest context include a table, a slide assembly, a pantograph, a router, and control mechanisms. Such components are individually configured and correlated with respect to each other so as to attain the desired objective.

First provided is a table 14. The table has a planar working surface 16. The working surface is in a horizontal plane. The working surface has depending legs 18. The depending legs maintain the table and working surface at a desired height. The working surface has a near side 20 and a parallel far side 22. Parallel lateral sides 24 are provided between the near side and the far side. The sides are in a rectangular configuration. A parallel rail 26 is provided. The rail is located above each lateral side. Two fixed blocks 28 are provided. The blocks are provided on each lateral side adjacent to the near and far sides. An inverted L-shaped spacer 30 is provided. The L-shaped spacer couples each lateral side with the associated fixed blocks. A pair of adjustable supports 32 is provided on each rail adjacent to the near and far side. The adjustable supports move to save the distance between the fixed blocks 28. The adjustable supports are preferably about ⅛ inch shorter than the fixed blocks and are needed for use in the middle of the table. The working surface has a center line 34. The center line is parallel with, and midway between, the lateral sides. In this manner the working surface is divided into a first half and a second half. Threaded holes 36 are provided in the L-shaped spacer adjacent to the second half.

A slide assembly 40 is provided. The slide assembly includes a shaft 42. The shaft has ends 44. The ends are positioned above the rails. The slide assembly has pair of brackets 46. The brackets couple the ends of the shaft with the rails. Each bracket has a circular upper hole 48. The circular upper hole rotatably receives the ends of the shaft. A cylindrical lower tunnel 50 is provided. The lower tunnel slidably receives the rails for supporting and moving the shaft in a path of movement always parallel with the near and far sides.

Provided next is a template 52. The template is removably positioned on the first half of the working surface. The template has primary recesses 54. There are secondary recesses 56 with profiles and depths in fence components. The profiles and depths of the primary recesses correspond to the profiles and depths of the secondary recesses 56. In this manner linear fence components 12 are formed.

A plurality of linear fence components 12 is provided next. The fence components are removably positioned in parallel relationship on the second half of the working surface. A first edge is in contact with the template and with a second edge. A threaded bolt 60 is provided. The threaded bolt extends through each threaded hole. In this manner the fence components are securely retained in parallel relationship with each other and in contact with the template. In an alternate embodiment of the invention, the threaded bolts are replaced by air assisted pistons.

A pantograph with a primary arm 62 is provided. The primary arm has a free exterior end 64. The free exterior end extends toward the far side. The primary arm also has an interior end 66. The interior end has a pin 68. The pin is pivotably coupled to the shaft midway between the center line and the rail without the threaded holes. The pantograph has a secondary arm 70. The secondary arm has a free exterior end 72. The free exterior end extending toward the far side. The secondary arm has an interior end 74. The interior end has a pin 76. The pin is pivotably coupled to the shaft midway between the center line and the rail with the threaded holes. Each arm includes a pair of vertical plates 78 and adjacent upper and lower plates 80, 82. A strengthening cylinder 84 is provided within the shaft. The pantograph also has a cross arm 86. The cross arm has ends. The ends are pivotally coupled to the primary and secondary arms adjacent to their free ends. Movement of the primary arm will cause corresponding movement of the secondary arm. The primary and secondary arms are always parallel to each other.

Further provided is a power driven router 88. The router is secured to, and depends from, the free end of the secondary arm. The router is located over the linear fence components. In this manner recesses are formed in the linear fence components.

Provided last are control mechanisms. The control mechanisms includes a scribe 90. The scribe is secured to, and depends from, the free end of the primary arm. The scribe is located over the template. The scribe has a knob 92. The knob is adapted to be held by a user in moving the scribe to outline the profile and depth of the primary recesses. The control mechanisms also includes a handle 94. The handle has an exterior end. The exterior end is formed with a grip 96 or counterweight. The handle also has an interior end 98. The interior end is threadedly coupled to the midpoint of the shaft for guiding the router in forming the depths of the primary and secondary recesses. The grip is also adapted to function as a variable counter weight by being rotated to increase and decrease the moment of inertia of the pantograph around the shaft. The grip is adapted to be held and moved by a user during operation and use and also to function as a counterweight to offset the weight of the router. It adjusts for different routers of different weights. A set screw preferably secures the grip or counterweight to the handle 94 to save the distance to the shaft 42 for ease of operation.

Figure 11:
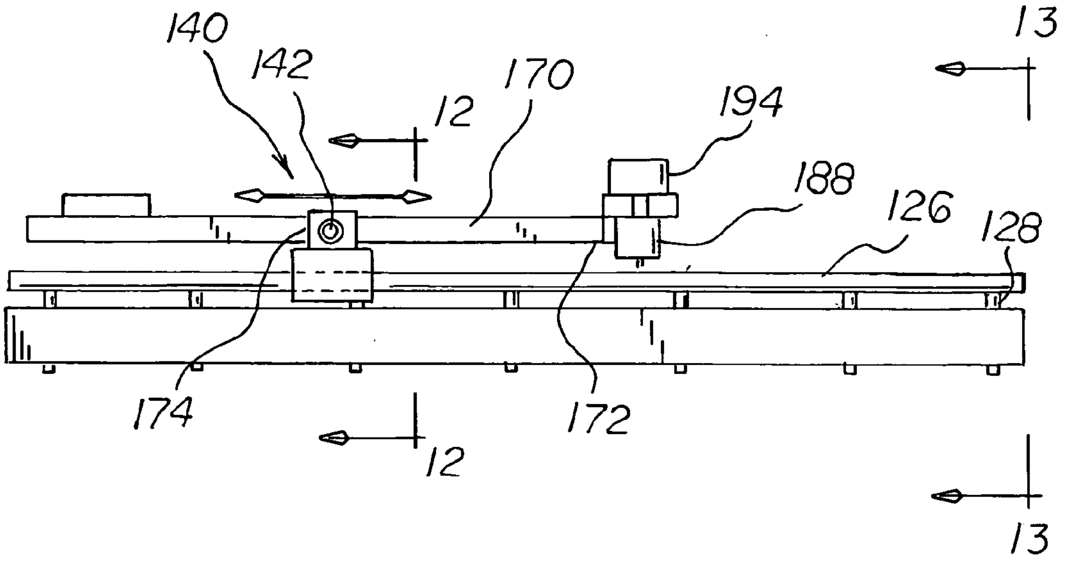
FIG. 11 is a side elevational view of the operating assembly, side rail and associated components taken along line 11—11 of FIG. 9.
Figure 12:
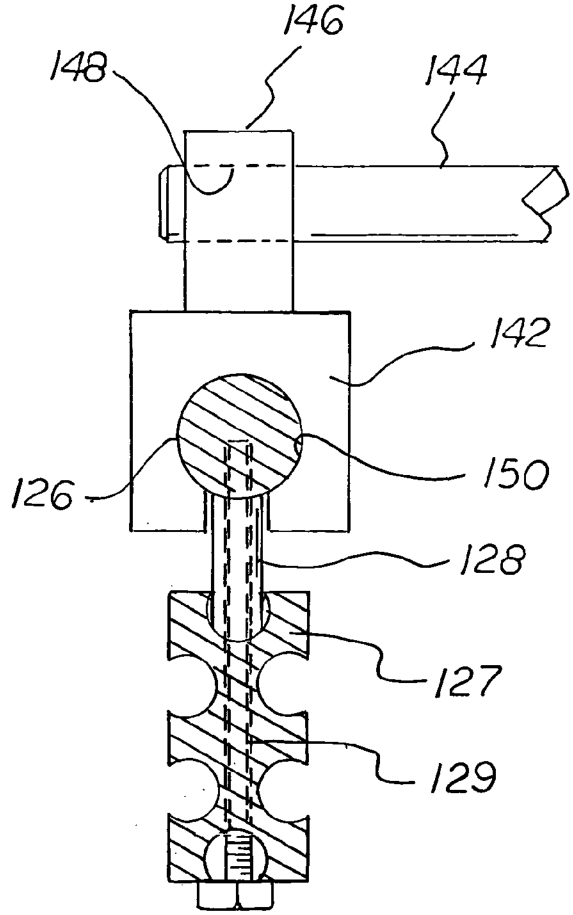
FIG. 12 is a cross sectional view of the system taken along line 12—12 of FIG. 11.

An alternate embodiment of the invention is shown in FIGS. 9–14. In such embodiment, the invention is a fence router table system 110 for supporting and routing linear fence components in a safe, accurate and efficient manner. The system comprises, in combination, a table 114 with a planar working surface 116. Such surface is in a horizontal plane. As in the prior embodiment, the table has depending legs to maintain the table and working surface at a desired height. The working surface having a near side 120 and a parallel far side 122 and parallel lateral sides 124 there between. The sides are thus in a rectangular configuration. A parallel rail 126 is located above each lateral side with fixed blocks 128 spaced along each lateral side supporting the rails.

The system further includes a support subassembly for each rail 126. Each support subassembly has an aluminum extruded base 127 with arcuate recesses for weight reduction. Each base has a bottom and a top. Each support subassembly also has a plurality of laterally spaced fixed tubular blocks 128. The blocks are fabricated of nylon and formed as precision shaft supports. Each fixed tubular block is located between the top of a base and a rail 126. The bases have vertical bores there through with bolts 129 extending upwardly through the bores and the blocks. The bolts are threadedly received in the rails along their lengths.

The working surface has a center line parallel with, and midway between, the lateral sides. The center line divides the working surface into a first half and a second half. There are also toggle clamps 103 associated with the system.

A slide assembly 140 is also provided. The slide assembly includes a side to side shaft 142 with ends 144 positioned above the rails. Also included is pair of brackets 146 coupling the ends of the shaft with the rails. Each bracket has a circular upper hole 148 receiving the ends of the shaft and a cylindrical lower tunnel 150 slidably receiving the rails. The brackets thus function for supporting and moving the shaft in a path of movement always parallel with the near and far sides. The tubular member may also be configured as a solid shaft. In the preferred embodiment, the shaft is solid however one skilled in the art would realize that the shaft may be solid or hollow.

A template 152 is next provided. The template is removably positioned on the first half of the working surface. The template has primary recesses 154. The recesses are formed with profiles.

Next provided are a plurality of linear fence components 112. Such fence components are removably positioned in parallel relationship on the second half of the working surface. The fence components include a first edge, one of which is in contact with the template. The fence components also have a second edge and an associated bolt and bolt hole (not shown). Such arrangement is to securely retain the fence components in parallel relationship with each other and in contact with the template. The fence components are adapted to receive secondary recesses 156 with profiles which correspond to the profiles of primary recesses in the template.

Next provided is an operating assembly. Their operating assembly includes a primary arm 162. The primary arm has a free exterior end 164 extending toward the far side. The primary arm also has an interior portion 166 slidably coupled to the shaft. The operating assembly also has a secondary arm 170 and a free exterior end 172. The exterior end extends toward the far side and has an interior portion 174 slidably coupled to the shaft. The exterior ends may act a counter weight 187 to balance the weight of the cutting device. The operating assembly also has cross arms 186 with ends coupled to the primary and secondary arms on opposite sides of the shaft. Such arrangement is for allowing the raising and lowering of the of the exterior ends of the arms between an operative orientation in contact with the template and fence components and an inoperative orientation there above. In this manner, movement of the primary arm will cause corresponding movement of the secondary arm with the primary and secondary arms always parallel to each other.

The operating assembly of the alternate embodiment differs in structure from the pantograph of the primary embodiment although their functions are substantially the same. The components of the alternate embodiment, other than the operating assembly, are essentially the same as in the primary embodiment.

A power driven cutting device, such as a router 188 is secured to, and depends from, the interior end of the secondary arm. The cutting device is located over the linear fence components for forming recesses in the linear fence components.

Lastly, provided are control mechanisms. The control mechanisms include a scribe 190 secured to, and depending from, the interior end of the primary arm. The scribe is located over the template with a knob 192 adapted to be held by a user in moving the scribe to outline the profiles of the primary recesses. The control mechanisms also includes a handle 194 being threadedly coupled to the shaft. These components are for guiding the cutting device through the movement of the scribe in forming the profiles of the primary in the secondary recesses. Movement of the scribe and cutting device in a first direction parallel with the rails is through the sliding of the shaft with respect to the rails while the movement in a second direction perpendicular to the rails is through the sliding of the arms with respect to the shaft. The grip is also adapted to function as a variable counter weight by being rotated to increase and decrease the moment of inertia of the operating assembly around the shaft.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A router system comprising:

a table with a working surface and with a parallel rail on each side of the working surface;

a slide assembly including a shaft with ends and a pair of brackets, each bracket having a hole receiving an end of the shaft and a cylindrical tunnel slidably receiving the rails;

an operating assembly with primary and secondary arms, each arm having an exterior end and an interior portion coupled to the shaft;

a cutting device secured to, and depending from, the exterior end of the secondary arm; and control mechanisms including a scribe secured to, and depending from, the exterior end of the primary arm whereby movement of the primary arm and scribe with respect to a template will cause corresponding movement of the secondary arm and cutting device with respect to work pieces to be routed.

2. The system as set forth in claim 1 wherein the working surface in a horizontal plane and with depending legs to maintain the table and working surface at a desired height, the working surface having a near side and a parallel far side and parallel lateral sides there between, the sides being in a rectangular configuration with a parallel rail located above each lateral side and with spaced blocks on each lateral side, the working surface having a center line parallel with, and midway between, the lateral sides to divide the working surface into a first half and a second half, the spacers adjacent to the second half having threaded holes there through.

3. The system as set forth in claim 2 and further including a template removably positioned on the first half of the working surface, the template having primary recesses with profiles and a plurality of linear fence components removably positioned in parallel relationship on the second half of the working surface with a first edge in contact with the template and with a second edge, the fence components being in a parallel relationship with each other and in contact with the template, the fence components adapted to receive secondary recesses with profiles corresponding the to the profiles of the primary recesses of the template.

4. The system as set forth in claim 3 wherein the primary arm has a free exterior end extending toward the far side and an interior portion slidably coupled with respect to the shaft, and the secondary arm has a free exterior end extending toward the far side and an interior portion slidably coupled with respect to the shaft, the operating assembly also having two cross arms with ends coupled to the primary and secondary arms whereby movement of the primary arm will cause corresponding movement of the secondary arm with the primary and secondary arms always parallel to each other.

5. The system as set forth in claim 1 and further including a support subassembly for each rail, each support subassembly having an aluminum extruded base with arcuate recesses for weight reduction and with a bottom and a top, each support subassembly also having a plurality of laterally spaced fixed blocks fabricated of nylon and formed as precision shaft supports, each fixed block being located between the top of a base and a rail, and coupled thereto.

6. A fence router table system for supporting and routing linear fence components in a safe, accurate and efficient manner comprising, in combination:

a table with a planar working surface in a horizontal plane and with depending legs to maintain the table and working surface at a desired height, the working surface having a near side and a parallel far side and parallel lateral sides there between, the sides being in a rectangular configuration with a parallel rail located above each lateral side and with fixed blocks spaced along each lateral side supporting the rails, the working surface having a center line parallel with, and midway between, the lateral sides to divide the working surface into a first half and a second half, with spaced spacers adjacent to the second half having threaded holes there through;

a support subassembly for each rail, each support subassembly having an aluminum extruded base with arcuate recesses for weight reduction and with a bottom and a top, each support subassembly also having a plurality of laterally spaced fixed blocks fabricated of nylon and formed as precision shaft supports, each fixed tubular block being located between the top of a base and a rail, the bases having vertical bores there through with bolts extending upwardly through the bores and the blocks and threadedly received in the rails along their lengths;

a slide assembly including a side to side shaft with ends positioned above the rails and a pair of brackets coupling the ends of the side to side shaft with the rails, each bracket having a circular upper hole receiving the ends of the side to side shaft and a cylindrical lower tunnel slidably receiving the rails for supporting and moving the side to side shaft in a path of movement always parallel with the near and far sides;

a template removably positioned on the first half of the working surface, the template having primary recesses with profiles;

a plurality of linear fence components removably positioned in parallel relationship on the second half of the working surface with a first edge in contact with the template and with a second edge, the fence components being retained in a parallel relationship with each other and in contact with the template, the fence components adapted to receive secondary recesses with profiles corresponding to the profiles of primary recesses in the template;

an operating assembly with a primary arm having a free exterior end extending toward the far side and having an interior portion slidably coupled to the side to side shaft, the operating assembly having a secondary arm and having a free exterior end extending toward the far side and having an interior portion slidably coupled to the side to side shaft, the operating assembly also having cross arms with ends coupled to the primary and secondary arms on opposite sides of the side to side shaft for allowing the raising and lowering of the of the exterior ends of the arms whereby movement of the primary arm will cause corresponding movement of the secondary arm with the primary and secondary arms always parallel to each other;

a power driven cutting device secured to, and depending from, the free end of the secondary arm, the cutting device being located over the linear fence components for forming recesses in the linear fence components; and control mechanisms including a scribe secured to, and depending from, the free end of the primary arm, the scribe being located over the template with a knob adapted to be held by a user in moving the scribe to outline the profiles of the primary recesses, the control mechanisms also including a handle with an exterior end constituting a grip and is coupled to the shaft for guiding the router in forming the profiles of the primary and secondary recesses.

* * * * *